United States Patent [19]

Lagoni

[11] Patent Number: 5,298,982
[45] Date of Patent: Mar. 29, 1994

[54] TELEVISION RECEIVER WITH SWITCHABLE CHROMINANCE SIGNAL FILTER

[76] Inventor: William A. Lagoni, 4707 W. 81st Pl., Indianapolis, Ind. 46268

[21] Appl. No.: 946,285

[22] Filed: Sep. 16, 1992

[51] Int. Cl.⁵ .......................... H04N 9/64; H04N 9/74
[52] U.S. Cl. .................................. 348/713; 348/708; 348/607; 348/711
[58] Field of Search ................... 358/21 R, 22, 23, 36, 358/38, 40; H04N 9/64, 9/74

[56] References Cited

U.S. PATENT DOCUMENTS

| | | | |
|---|---|---|---|
| 3,969,762 | 7/1976 | Favreau | 358/38 |
| 4,603,353 | 7/1986 | Henson | 358/38 |
| 4,616,252 | 10/1986 | Schiff | 358/23 |
| 4,620,220 | 10/1986 | Naimpally et al. | 358/40 |
| 4,651,196 | 3/1987 | Harwood et al. | 358/40 |
| 4,907,073 | 3/1990 | Sugiyama | 358/40 |
| 4,935,807 | 6/1990 | Sendelweck | 358/21 R |
| 4,963,958 | 10/1990 | Sendelweck | 358/22 |
| 4,963,979 | 10/1990 | Sendelweck | 358/22 |
| 5,107,341 | 4/1992 | Sendelweck et al. | 358/22 |

Primary Examiner—Mark R. Powell
Assistant Examiner—John W. Miller
Attorney, Agent, or Firm—Joseph J. Tripoli; Peter M. Emanuel; Richard G. Coalter

[57] ABSTRACT

A fixed filter determines a lower portion of the amplitude characteristic of a chrominance signal sideband correction filter. A variable filter determines the upper portion of the amplitude characteristic. A control signal tunes the variable filter for providing a symmetrical response for video signals having balanced color sidebands and tunes the variable filter for providing an asymmetrical response for video signals having unbalanced sidebands.

10 Claims, 8 Drawing Sheets

TELEVISION RECEIVER WITH SWITCHABLE CHROMINANCE SIGNAL FILTER

FIELD OF THE INVENTION

This invention relates to color television receivers generally and particularly to color television receivers of a type having multiple inputs for RF and baseband video sources and also having provisions for variably filtering the chrominance component of a selected video input signal.

BACKGROUND OF THE INVENTION

A problem of color distortion can arise in color television receivers of the type having both RF (radio frequency) and baseband video input signal sources. More specifically, when one displaying a video signal provided from an RF signal source provided by a tuner and associated IF (intermediate frequency) amplifier and detector, it is necessary to filter the chrominance signal to correct for sideband distortion. Distortion results because the IF filter tends to suppress the upper sideband of the chrominance signal relative to the lower sideband and this unbalance of sidebands can lead to visible color distortion in displayed images. Conventionally, the correction is made by use of a chrominance band pass filter having a "sloped" or non-symmetrical response which attenuates the lower sideband such that the overall response is about the same (symmetrical) for the two sidebands. On the other hand, video signals provided by an auxiliary baseband video input are typically reasonably well balanced (symmetrical) signals and require only conventional symmetrical band pass filtering.

Color television receivers with source dependent variable chrominance signal filtering are known. An example is described by Sendelweck et al. in U.S. Pat. No. 5,107,341 entitled COLOR TELEVISION APPARATUS WITH PICTURE IN PICTURE PROCESSING AND WITH VARIABLE CHROMINANCE SIGNAL FILTERING which issued Apr. 21, 1992. An exemplary embodiment of the Sendelweck receiver includes a picture-in-picture processor and a variable filtering circuit for switching between a "slope" type filter and a symmetrical or "haystack" type of filter. A control signal is supplied to the filter selection switch so as to select the "slope" type filter for the chrominance signal when the main picture being displayed is provided by an RF signal source and for selecting the "haystack" or symmetrical filter when the main picture being displayed is provided from an auxiliary video source.

SUMMARY OF THE INVENTION

The present invention simplifies the chrominance signal processing by a combination of fixed and tunable filters which, in addition to properly conditioning the chrominance signal based on the signal source, also provides improved group delay characteristics and an advantage in suppressing interference from a non-video source such as, for example, FM radio.

A chrominance signal sideband correction filter, embodying the invention, comprises first means for determining a lower portion of the amplitude characteristic of said sideband correction filter; second means for determining an upper portion of the amplitude response of said sideband correction filter; and means for tuning said second means to a first condition for providing a symmetrical overall amplitude response and for tuning said second means to a second condition for providing an asymmetrical overall amplitude response for said sideband correction filter.

BRIEF DESCRIPTION OF THE DRAWING

The foregoing and further features of the invention are illustrated in the accompanying drawing, wherein.

DETAILED DESCRIPTION

Figure 1:
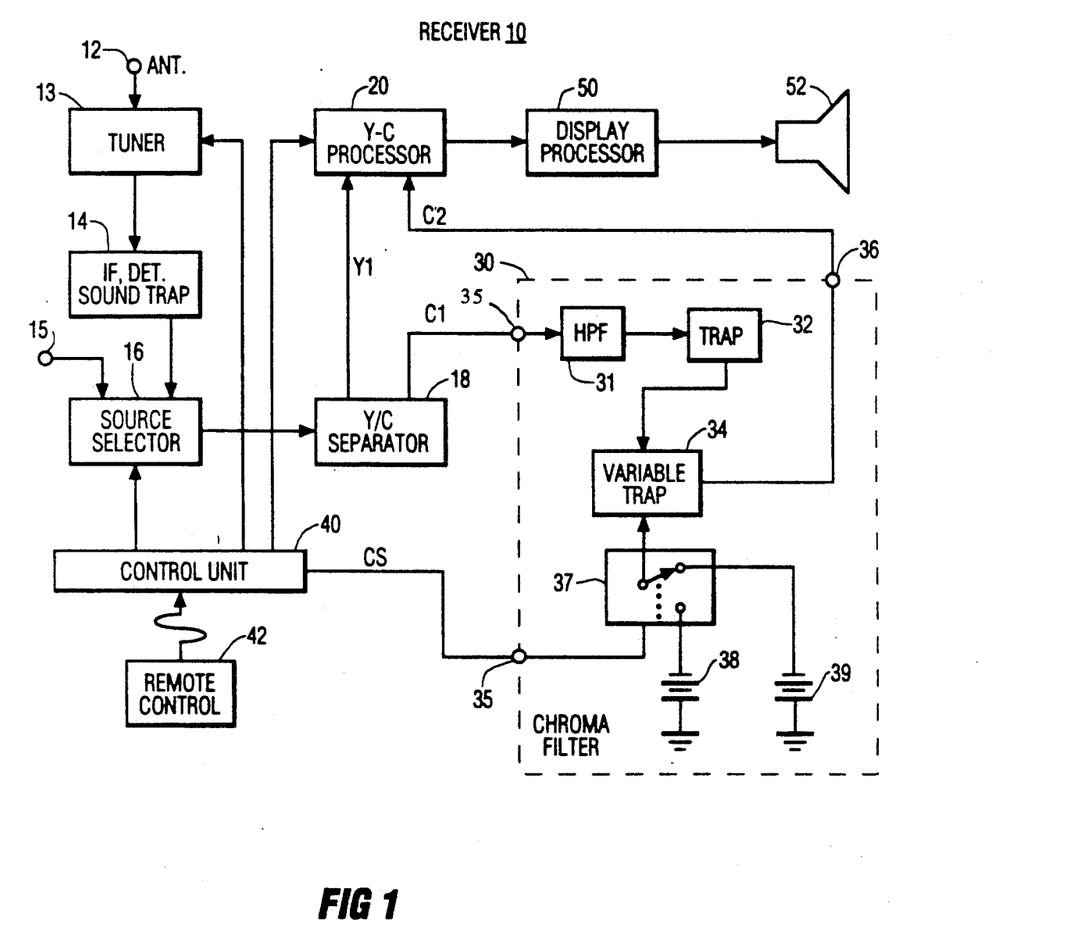
FIG. 1 is a block diagram of a color television receiver embodying the invention.

The receiver 10 of FIG. 1 comprises inputs 12 and 15 for receiving, respectively, RF signals and auxiliary baseband video signals. The RF signal is applied via a tuner 13 and an IF amplifier, detector and sound trap 14 to one input of a signal source selector switch 16 which receives the auxiliary baseband video input from input 15. Selected source signals are applied to a luminance/-chrominance signal separator 18 which supplies a separated luminance signal Y1 to one input of a luminance,/-chrominance signal processor 20. The separated chrominance signal C1 is applied to a chrominance filter 30 (outlined in phantom) which provides a variably filtered chrominance signal C2 to a second input of the Y-C processor 20. Processor 20 provides conventional functions such as color demodulation, hue and saturation control, brightness and contrast control, etc. and supplies processed luminance and chrominance component signals to a display processor 50 that matrixes the signals and generates RGB format signals for display by a display device 52 such as a kinescope, a LCD display or some other suitable display. Control of the receiver (e.g., channel selection, source selection, video processing , etc. is provided by a receiver control unit (e.g., a microprocessor) 40 controlled by a user remote control unit 42.

The chrominance signal filter 30, under the control of unit 40, selects asymmetrical chroma filtering when the tuner source is selected by the user (to correct for the receiver EF amplifier response) and selects symmetrical response for the chrominance signal band pass characteristic when the auxiliary input signal is selected.

Filter 30 comprises a cascade connection of a high pass filter 31, a fixed frequency trap 32 and a variable frequency trap 34 coupled between the input terminal 40 and the output terminal 36. Control of the variable frequency trap 34 is provided by a switch 37 which selects reference voltages provided by reference voltage sources 38 and 39 (illustrated, for simplicity, as batteries) selected by a control signal CS provided by the control unit 40 to a control input 35 of chroma filter 30.

In operation, the change in trap frequency determines whether the filter exhibits a symmetrical response (for auxiliary input signal selection) or asymmetrical response (for tuner provided video).

Recall that in prior art systems the conventional approach is to use a separate symmetrical filter for auxiliary input signals and an asymmetrical filter for RF provided input signals to compensate for the sideband differences of the two sources and a video switch for selecting the appropriate filter.

Figure 2:
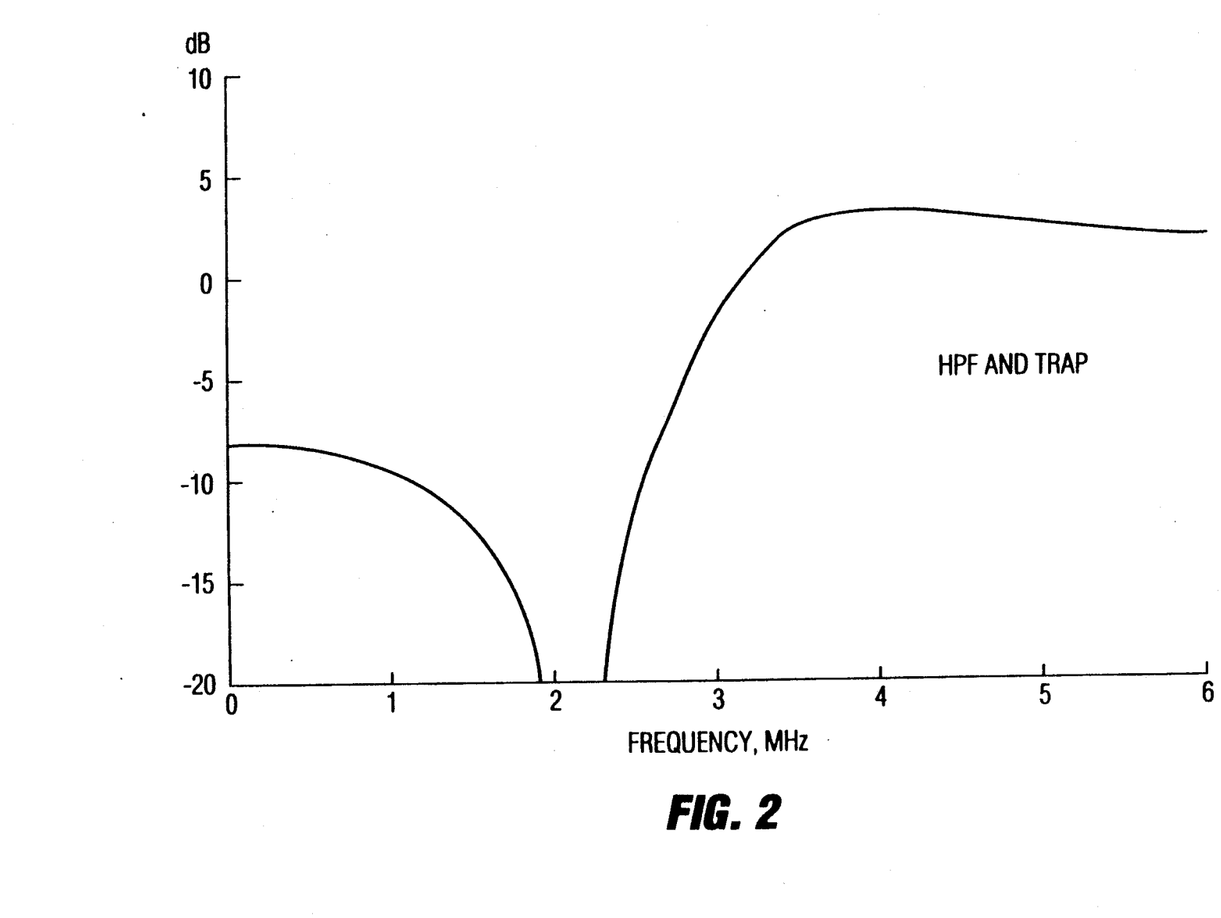
FIG. 2 is a response diagram of a high pass filter used in the receiver of FIG. 1.
Figure 3:
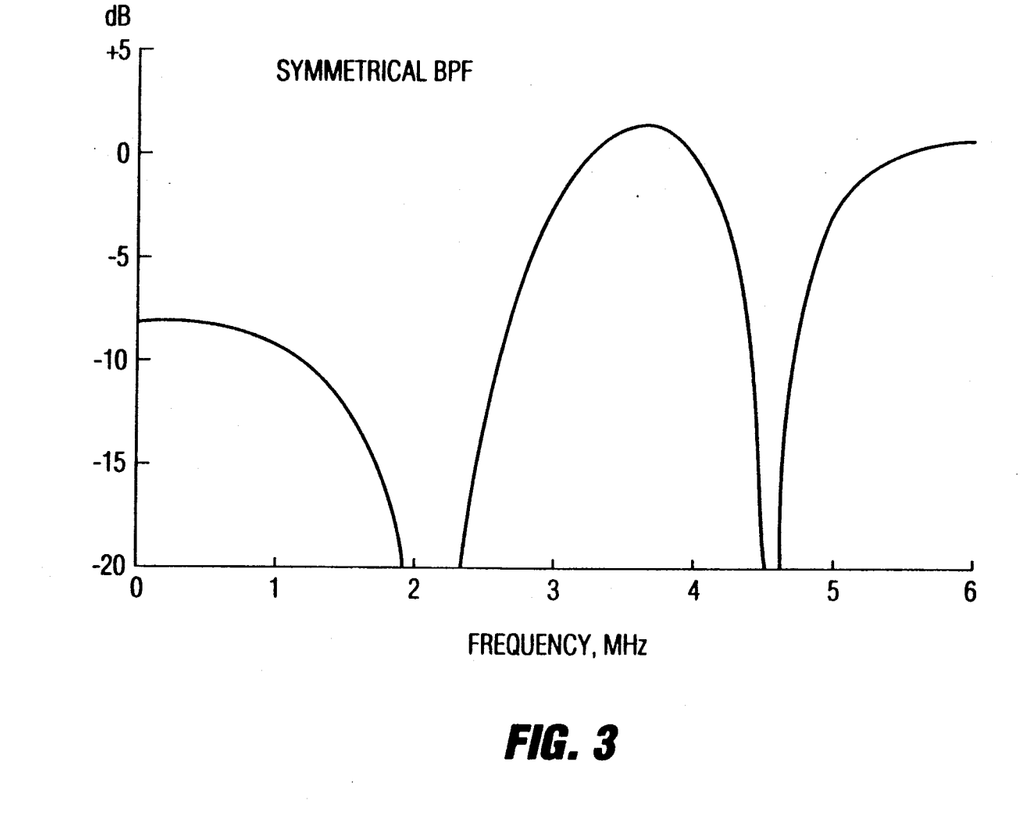
FIGS. 3-6 are response diagrams illustrating the amplitude and group delay characteristics of the color filter used in the receiver of FIG. 1.
Figure 4:
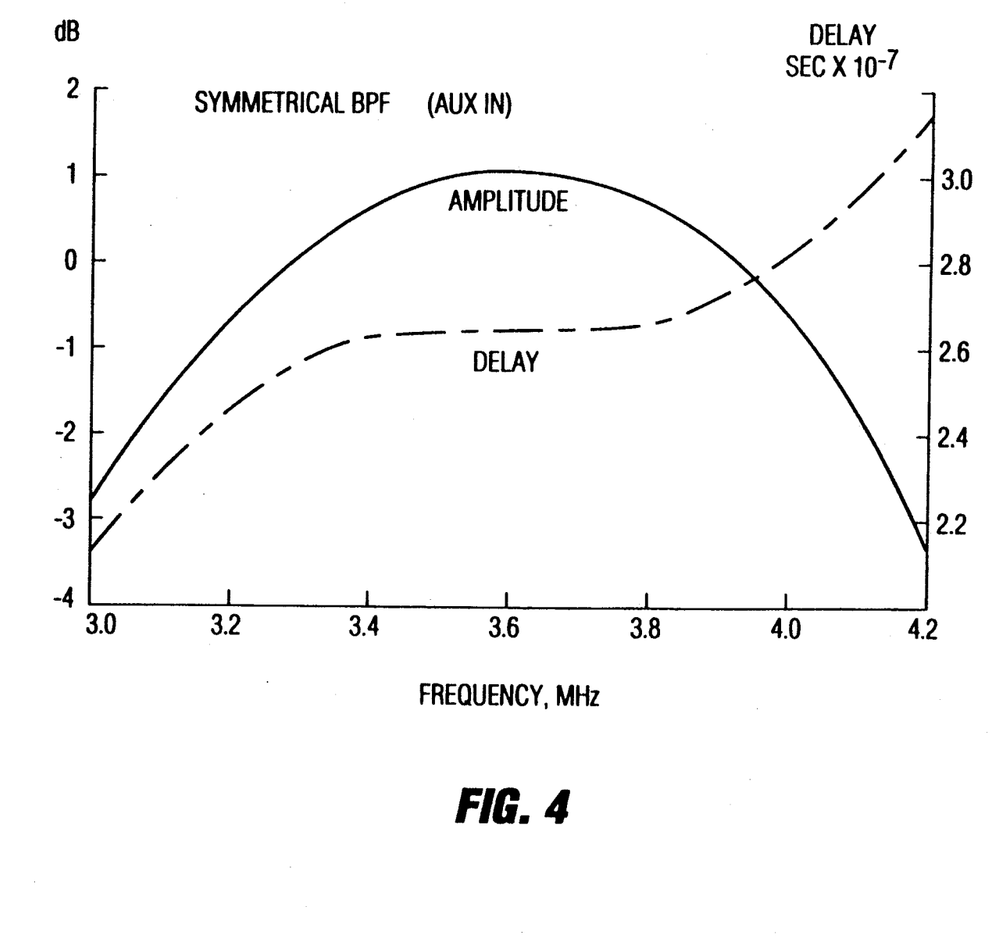
Figure 5:
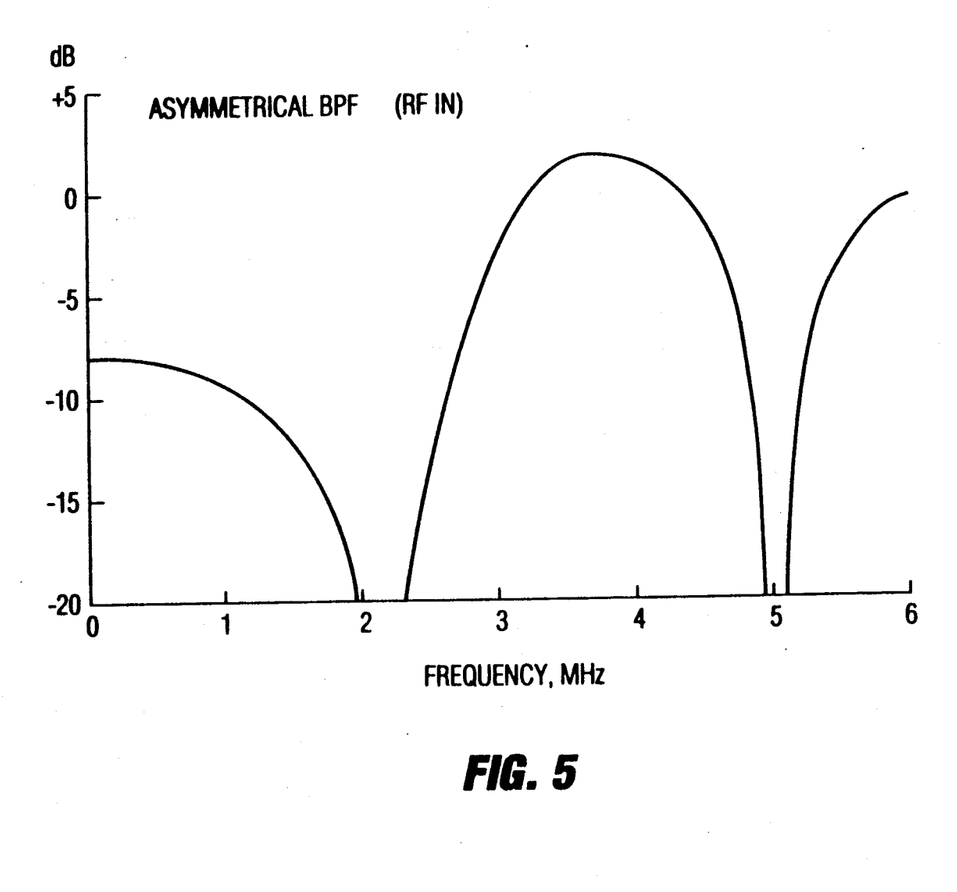
Figure 6:
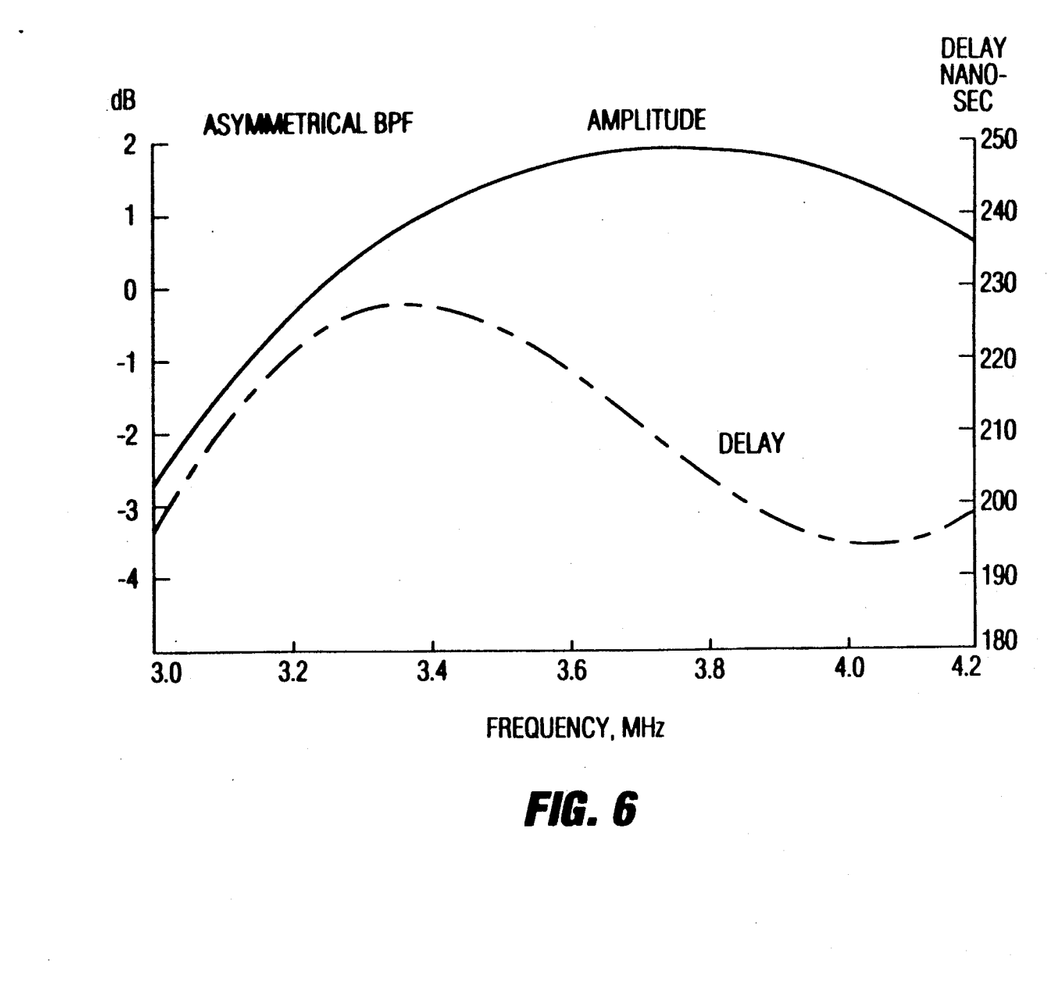

Advantageously, the need for two separate filters and a selection switch is eliminated in the present invention. Instead the variable filtering function is implemented by a high pass filter 31, a fixed frequency trap 32 and a variable frequency trap 34. The present invention additionally provides amplitude rejection at one-half the chrominance signal frequency (to avoid problems with aliasing of chroma components), symmetrical group delay about the chroma subcarrier frequency and phase equalization of the system 4.5 MHz trap. The combined effects of the high pass filter 31 and fixed frequency trap 32 are illustrated in FIG. 2 where it is seen that the sub-harmonic of the chrominance signal is sharply rejected.

In more detail, the low frequency trap 32 provides rejection at about half of the chroma frequency and, in combination with the slightly underdamped response of the high pass filter, determines the low frequency side (below 3.58 MHz) of the chroma response for both the symmetric and asymmetric modes.

The variable chrominance signal trap 34 is tuned to a frequency of 5 MHz in the asymmetric mode (by virtue of control unit 40). Advantageously, this prevents interference (in the USA) between channel 6 and low frequency (e.g., FM stations). In combination with the underdamped nature of the high pass filter 31 it provides the high frequency (above 3.58 MHz) response for the filter in the asymmetric mode. To accomplish the symmetric response mode for the auxiliary input video signal, the chroma trap frequency is varied (tuned) lower, to 4.55 MHz, to determine the response symmetry above 3.58 MHz. This is feasible in that the FM rejection is only required when band pass filter is in the asymmetric mode.

Phase equalization in the two modes is accommodated by having the chroma trap 34 tuned high in the case where the 4.5 MHz trap will dominate the response above 3.58 MHz and lower when the group delay of the 4.5 MHz trap is not present. In the symmetrical mode, the chroma trap 34 will provide group delay symmetry about 3.58 MHz, the color subcarrier frequency.

FIG. 2 shows the overall effect of the high pass filter 31 and the fixed trap 32. As noted, this determines the low frequency half of the overall bandpass response and also provides a notch at half the subcarrier frequency for antialiasing (e.g, in subsampled digital systems).

Figure 7A:
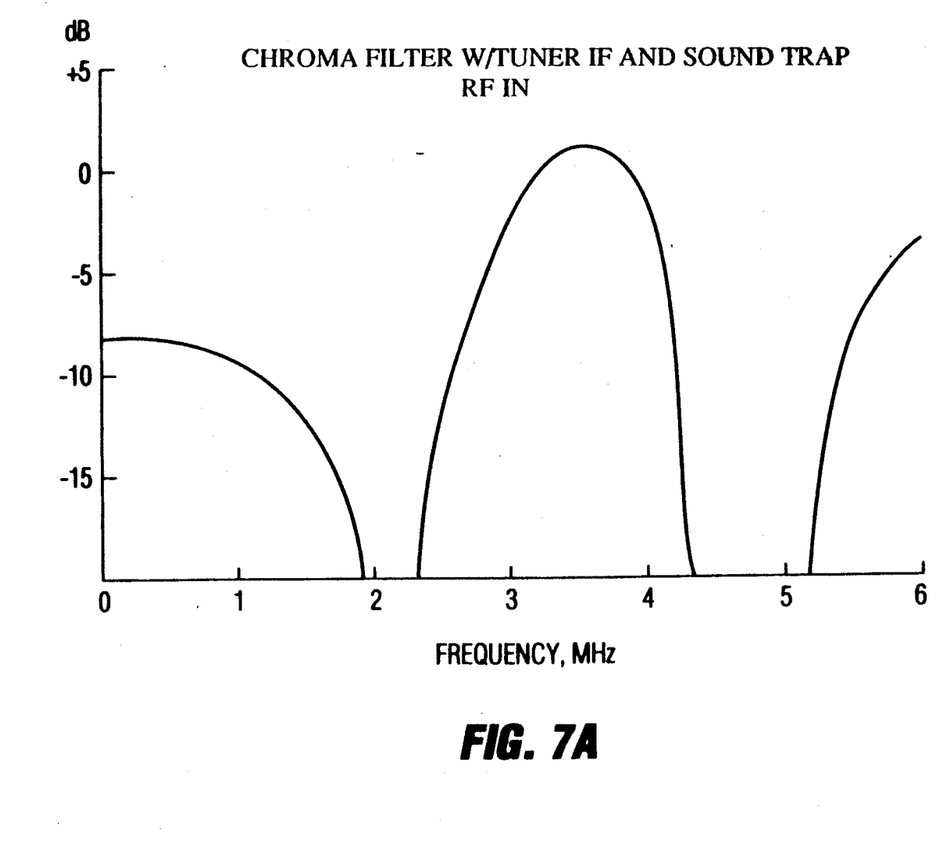
FIG. 7 illustrates the overall group delay response of the chrominance filter in combination with the IF response for the receiver of FIG. 1.
Figure 7B:
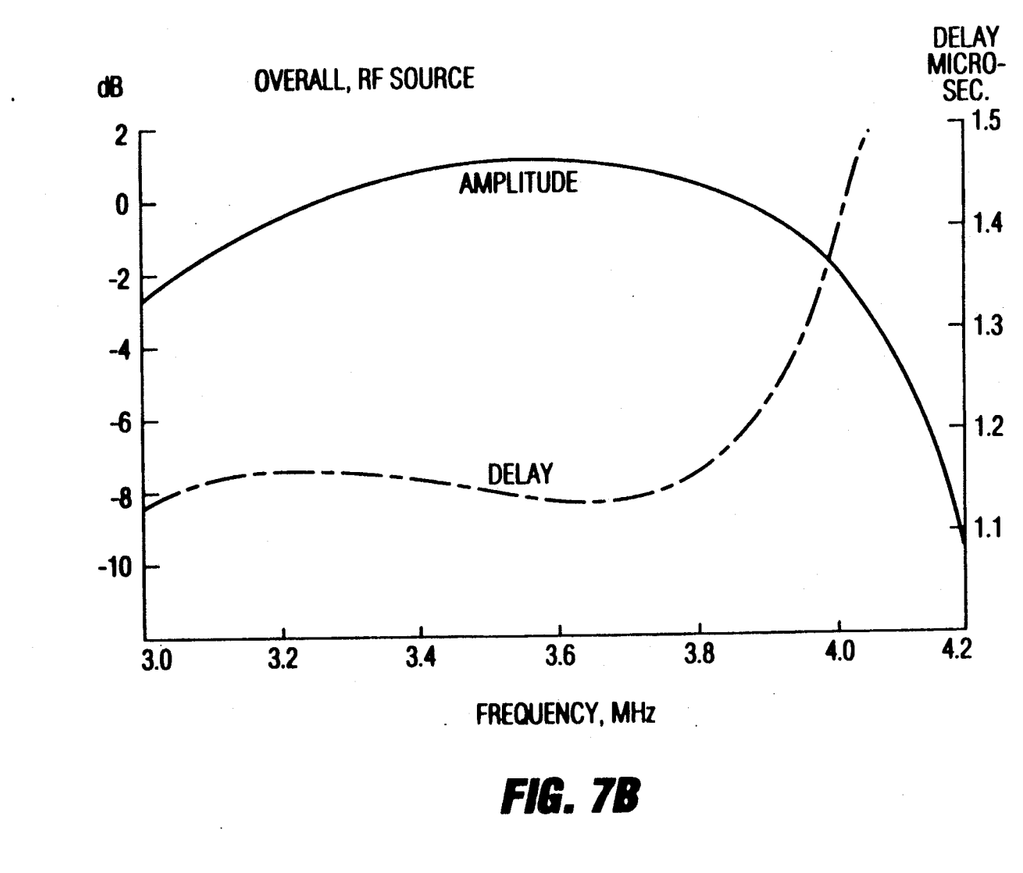

FIGS. 3 through 6 show the amplitude and group delay responses of the chroma filter in the two modes of operation (symmetrical and asymmetrical) while FIG. 7 shows the group delay response of the chroma filter in cascade with the tuner 13, IF and 4.5 MHz sound trap 14. As shown in these figures, the substantially constant group delay is achieved, variable symmetry is achieved, by only changing the notch position of the variable notch filter. Additionally, for RF input sources, FM radio interference is suppressed by the presence of the 5 MHz notch location (thus preventing interference from low band FM stations, e.g., 88 MHz from TV channel 6 which differ by about 5 MHz.

Various changes and modifications may be made to the illustrated embodiments of the invention. For example, although analog devices (e.g., active filters) have been used in the illustrated embodiment, digital devices may be used instead which provide the equivalent overall functions which provide low pass filtering with a low side fixed notch and variable high side notch filtering.

There has been shown and described a chrominance signal sideband correction filter in which a fixed filter determines a lower portion of the passband response of the correction filter and a variable filter determines the upper portion of the amplitude response and in which the variable filter is tunable to provide either symmetrical or asymmetrical overall amplitude response.

What is claimed is:

1. A chrominance signal sideband correction filter, comprising:

input means for receiving a selected one of a symmetrical chrominance input signal and a non-symmetrical chrominance input signal;

output means for providing a sideband corrected chrominance output signal;

a fixed high pass filter means coupled between said input and output means for determining a lower portion of the amplitude characteristic of said sideband correction filter;

a variable filter means coupled in cascade with said fixed high pass filter for providing attenuation of an upper sideband of said selected chrominance signal at one of two selectable frequencies for determining an upper portion of the amplitude characteristic of said sideband correction filter; and frequency control means coupled to said variable filter means for tuning said variable filter means to one of said two selectable frequencies when a symmetrical chrominance input signal is selected and for tuning said variable filter to the other of said two selectable frequencies otherwise.

2. A sideband correction filter, comprising:

an input for receiving a selected one of a symmetrical chrominance input signal and a non-symmetrical chrominance input signal;

a fixed filter and a variable filter connected in cascade between said input and an output of said sideband correction filter for providing sideband correction for said selected chrominance input signal;

said fixed filter comprising a high pass filter;

said variable filter for providing attenuation of the upper sideband of chrominance output signal at one of two selectable frequencies; and frequency control means coupled to a frequency control input of said variable filter for tuning said variable filter to one of said two selectable frequencies for symmetrical chrominance input signals and for tuning said variable filter to the other of said two selectable frequencies for asymmetrical chrominance input signals.

3. A sideband correction filter as recited in claim 2 further comprising:

a further filter in said cascade connection for attenuating said selected chrominance signal at a frequency below the color subcarrier thereof.

4. A sideband correction filter as recited in claim 2 further comprising:

a further filter in said cascade connection for attenuating said selected chrominance signal at a frequency of about one half of that of the subcarrier frequency of said selected chrominance signal.

5. A sideband correction filter as recited in claim 2 wherein:

said variable filter comprises a voltage tuned trap filter having a control input for receiving a control voltage for controlling the attenuation frequency of said trap filter; and said frequency control means comprises means for applying a first DC control voltage to said control input of said variable filter when said selected chrominance signal has asymmetrical sidebands and for applying a second DC control voltage to said control input of said variable filter otherwise.

6. A sideband correction filter as recited in claim 2 further comprising:

a further filter connected in cascade with said high pass filter and said variable filter; and wherein:

said high pass filter providing attenuation below the subcarrier frequency of said selected chrominance signal for determining the shape of the lower sideband of said selected chrominance signal; and said further filter providing attenuation of said selected chrominance signal at a frequency of about one half of that of the subcarrier frequency thereof.

7. A sideband correction filter as recited in claim 2 wherein:

said one of said two selectable frequencies is of a lower frequency than said other of said two selectable frequencies.

8. A method of color sideband amplitude correction, comprising:

selecting between symmetrical and non-symmetrical chrominance input signals to provide a selected chrominance output signal;

applying attenuation to the lower sideband of said selected chrominance signal at a fixed frequency;

applying attenuation to the upper sideband of said selected chrominance signal at one of two selectable frequencies; and selecting the lower one of said two selectable frequencies for attenuation when said selected chrominance output signal has symmetrical sidebands and selecting the higher one of said two selectable frequencies for attenuation when said chrominance output signal has non-symmetrical sidebands.

9. A method of color sideband amplitude correction as recited in claim 8, further comprising:

applying attenuation to said selected chrominance output signal at a frequency of about one half of the color subcarrier of said chrominance output signal.

10. A chrominance signal sideband amplitude correction filter, comprising:

a television tuner system for providing a first chrominance signal having asymmetrical sidebands;

a source for providing a second chrominance signal having symmetrical sidebands;

a switch coupled to said tuner system and to said source for selecting between said first and second chrominance signals to provide a selected chrominance output signal;

a high pass filter, a fixed trap filter and a variable trap filter coupled in cascade between an output of said switch an input of a utilization means;

said high pass filter applying high pass filtering to said selected chrominance output signal with fixed transfer characteristics;

said fixed trap filter applying attenuation to said selected chrominance signal at a given frequency in addition to the attenuation provided by said high pass filter;

said variable trap filter applying attenuation to the upper sideband of said selected chrominance signal at one of two selectable frequencies; and frequency control means coupled to a control input of said variable trap filter for selecting the lower one of said two selectable frequencies for attenuation when said selected chrominance output signal has symmetrical sidebands and for selecting the higher one of said two selectable frequencies for attenuation when said chrominance output signal has non-symmetrical sidebands.

* * * * *